(12) United States Patent
Zhang et al.

(10) Patent No.: US 11,575,308 B1
(45) Date of Patent: Feb. 7, 2023

(54) HIGH-ATTENUATION WIDEBAND ACTIVE COMMON-MODE EMI FILTER SECTION

(71) Applicant: City University of Hong Kong, Hong Kong (HK)

(72) Inventors: Kun Zhang, Hong Kong (HK); Shu Hung Henry Chung, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 17/469,858

(22) Filed: Sep. 8, 2021

(51) Int. Cl.
*H02M 1/12* (2006.01)
*H02M 1/44* (2007.01)
*G05F 3/26* (2006.01)

(52) U.S. Cl.
CPC ............ *H02M 1/123* (2021.05); *G05F 3/265* (2013.01); *H02M 1/126* (2013.01); *H02M 1/44* (2013.01)

(58) Field of Classification Search
CPC ........ H02M 1/123; H02M 1/126; H02M 1/44; G05F 3/26; G05F 3/265
See application file for complete search history.

(56) References Cited

U.S. PATENT DOCUMENTS

| | | | | |
|---|---|---|---|---|
| 2012/0293263 | A1* | 11/2012 | Griffith | H03F 1/083 330/260 |
| 2022/0029548 | A1* | 1/2022 | Jeong | H02M 5/293 |

OTHER PUBLICATIONS

Y. Zhang, Q. Li, and D. Jiang, "A Motor CM Impedance Based Transformerless Active EMI Filter for DC-Side Common-Mode EMI Suppression in Motor Drive System," IEEE Trans. Power Electron., vol. 35, No. 10, pp. 10238-10248, 2020.
S. Takahashi, S. Ogasawara, M. Takemoto, K. Orikawa, and M. Tamate, "Common-Mode Voltage Attenuation of an Active Common-Mode Filter in a Motor Drive System Fed by a PWM Inverter," IEEE Trans. Ind Appl., vol. 55, No. 3, pp. 2721-2730, 2019.
M. L. Heldwein, H. Ertl, J. Biela, and J. W. Kolar, "Implementation of a Transformerless Common-Mode Active Filter for Offline Converter Systems," IEEE Trans. Ind. Electron , vol. 57, No. 5, pp. 1772-1786, 2010.
J. Biela, A. Wirthmueller, R. Waespe, M. L. Heldwein, K. Raggl, and J. W. Kolar, "Passive and Active Hybrid Integrated EMI Filters," IEEE Trans. Power Electron., vol. 24, No. 5, pp. 1340-1349, 2009.
D. Shin, S. Jeong, and J. Kim, "Quantified Design Guidelines of a Compact Transformerless Active EMI Filter for Performance, Stability, and High Voltage Immunity," IEEE Trans. Power Electron., vol. 33, No. 8, pp. 6723-6737, 2018.

* cited by examiner

*Primary Examiner* — Gary L Laxton
(74) *Attorney, Agent, or Firm* — Idea Intellectual Limited; Margaret A. Burke; Sam T. Yip

(57) ABSTRACT

An active common mode filter is configured to be positioned between a power supply and a switching converter-device/load for reducing common mode noise. The active common mode filter includes an active capacitor that has a sensing stage including one or more sensing capacitors, an amplifying stage including a common collector amplifier for mitigating an input voltage divider effect coupled to a common emitter amplifier for providing high gain, and an injection stage including one or more injection capacitors. Depending on the required attenuation in different applications, a multistage active common mode filter may be formed with a necessary number of stages, each stage including an active capacitor and an inductor.

10 Claims, 24 Drawing Sheets

132    FIG. 3A    134

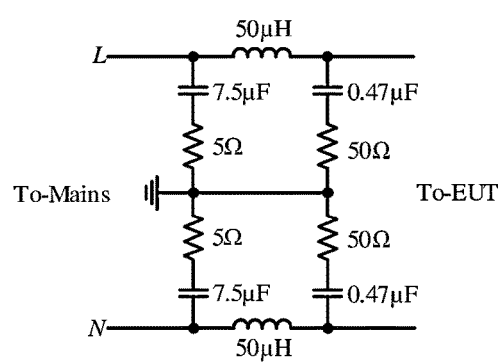
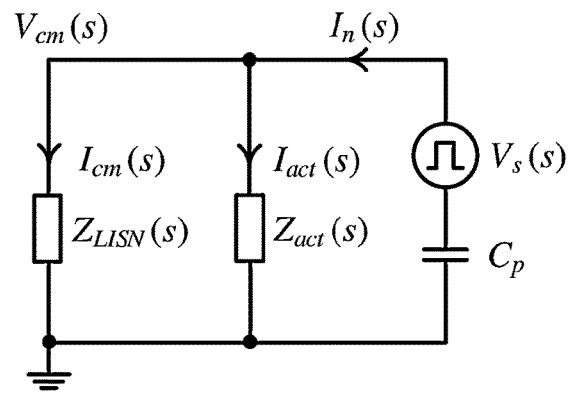
FIG. 5A
FIG. 5B
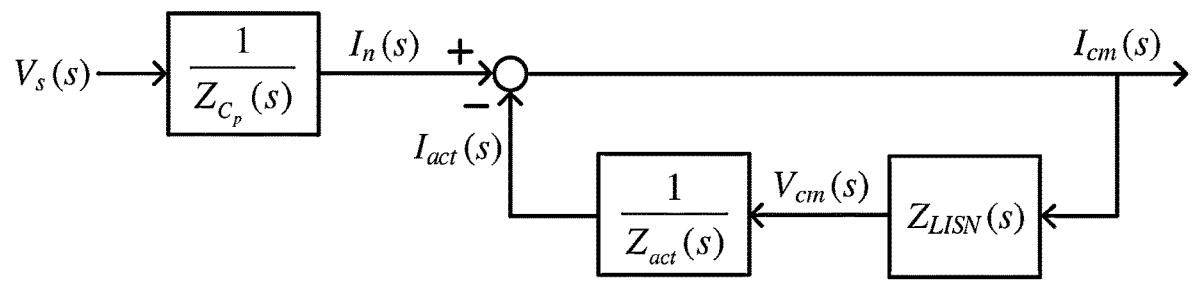
FIG. 5C

HIGH-ATTENUATION WIDEBAND ACTIVE COMMON-MODE EMI FILTER SECTION

FIELD OF THE INVENTION

The present invention relates to EMI filtering and, more particularly to EMI filtering with active common-mode filters that include active capacitors.

BACKGROUND

Power electronic equipment creates electromagnetic interference (EMI). For example, it is well known that switching-mode power converters generate electromagnetic interference (EMI). Due to the latest advances in semiconductor technology, the operating frequency of power switching devices continues to increase. However, faster switching frequency causes higher EMI noise. In particular, EMI can propagate along power cables. Typically, a passive filter (e.g., a combination of inductors and capacitors) is used to reduce EMI. However, when a power cable is connected to the passive filter, the cable may act as a distributed line that worsens the attenuation characteristic of the passive filter at the anti-resonant frequencies of the cable. Concerning the filter inductor, it is limited by its magnetic material core; therefore, the inductor volume cannot be reduced significantly. The inductors become a bottleneck in increasing the power density of the entire system.

According to the propagation paths, EMI noise can be classified into differential-mode (DM) and common-mode (CM) noise. For safety reasons, the leakage current introduced by the Y-capacitors in the CM filter should be within the standard limits, such as IEC 60950. Hence, a large CM inductance becomes necessary to operate with small Y-capacitance to achieve the required attenuation. Even though progress has been made in advancing the magnetic materials and winding techniques, CM chokes still occupy considerable volume and weight in power converters.

Active EMI filters present an alternative by using active components to replace some passive components in order to reduce volume. The general topologies of active EMI filters may be classified based on the noise sensing and compensation methods; active CM filters (ACF) can be classified into four main types: voltage-sensing and voltage-compensation (VSVC), voltage-sensing and current-compensation (VSCC), current-sensing and voltage-compensation (CSVC), current-sensing and current-compensation (CSCC).

Active and passive EMI filters have similar working principles. A voltage-compensation active filter forms a high impedance path in series with noise sources to attenuate the noise, acting as an inductor. A current-compensation active filter forms a low impedance path in parallel with noise sources to circulate high-frequency noise, acting as a capacitor. Transformers are required in the current-sensing and voltage-compensation stages. However, the presence of parasitic capacitance and the degradation of magnetic permeability will hinder high-frequency performance of the transformers.

VSCC ACFs do not require transformers. It is a promising topology to achieve better high-frequency performance and smaller volume than the other three types. While it has been shown that VSCC ACF are viable, there have been few applications due to their limited operating range. The bandwidth of conventional VSCC ACFs is usually below several megahertz, and the structure has one VSCC section only. When the CM noise is too large to handle, the value of the CM inductor should be increased so that the required attenuation can be achieved. Compared with passive filters, the CM inductance in the ACF is reduced. However, the volume of CM chokes still dominates the total filter volume.

Thus, there is a need in the art for improved active common-mode filters (ACF). Improved ACFs should have smaller volumes and a wider range of attenuation frequencies to make them sufficiently practical for use with various power supplies/power equipment.

SUMMARY OF THE INVENTION

This present invention proposes a solution to this problem in the form of an active common-mode filter (ACF) that uses a high-speed amplifier. Experimental results show that the proposed filter improves the attenuation characteristics of the passive filter and reduces the common-mode voltage propagating through the cable over a wide range of frequencies from 150 kHz to 30 MHz which is the typical measurement range of conducted EMI The voltage-sensing and current-compensation (VSCC) section is essentially an active capacitor. In one embodiment, multiple active capacitors can be used in a multistage ACF when high attenuation is needed. Active capacitors may be combined with passive inductors, as well as combining active capacitors with active inductors. Hence, the concept of the ACF can be extended, and a new category of ACF has been developed.

Through the use of active devices, a new VSCC ACF with small CM inductance is provided. The proposed ACF has the following properties.

1) Low cost and high immunity to high voltage transients: The proposed active capacitor may be connected to power lines through Y-capacitors; high voltage transients would appear. BJTs are used in the amplifying stage as they have better immunity to high voltage transients and lower cost than wideband Op-amps.

2) Wideband: In view of low CM noise power, class A amplifiers may be selected for their wide bandwidth and high linearity even though their power efficiency is lower than other types, such as class AB amplifiers. Since discrete components have larger parasitic parameters than IC Op-amps, the sophisticated configuration of IC Op-amps is less applicable for the amplifying stage of the active capacitor. The inventive active capacitor uses minimal stages for the class A amplifiers to avoid performance degradation by the parasitic parameters of discrete BJTs. The ACF has a wide bandwidth from 150 kHz to 30 MHz.

3) High-attenuation: The proposed active capacitor utilizes a common-collector (CC) amplifier to mitigate the input voltage divider effect and a common-emitter (CE) amplifier with active load to provide high gain. Hence, the ACF of the present invention provides high attenuation of the CM noise.

4) General multistage structure: The magnitude of CM noise is proportional to the area of pulsating voltage nodes. High-power converters usually have large heatsinks, resulting in high CM noise. Low-power converters usually have relatively lower CM noise. The present invention provides an ACF section that can be used alone or with multiple ACF sections can be cascaded to form a multistage structure. Different attenuation levels can be selectively achieved based on the number of ACF sections used.

In one aspect, the present invention provides an active common mode filter configured to be positioned between a power supply and a switching converter-device/load for reducing common mode noise. The active common mode filter includes an active capacitor that has a sensing stage including one or more sensing capacitors, an amplifying stage including a common collector amplifier for mitigating an input voltage divider effect coupled to a common emitter amplifier for provide high gain, and an injection stage including one or more injection capacitors.

In another aspect, the present invention provides a multistage active common mode filter configured to be positioned between a power supply and a switching converter-device/load for reducing common mode noise. The multistage ACF includes a first stage including a first active common mode filter, and a first inductor, the first stage is configured to generate a first-filtered current from an input current supplied by a power supply. A second stage includes a second active common mode filter and a second inductor, the second stage is configured to generate a second-filtered current from the first-filtered current. Each of the first and second active common mode filters includes an active capacitor that has a sensing stage including one or more sensing capacitors, an amplifying stage including a common collector amplifier for mitigating an input voltage divider effect coupled to a common emitter amplifier for provide high gain, and an injection stage including one or more injection capacitors.

BRIEF DESCRIPTION OF THE DRAWINGS

FIG. 3A-3B shows a single-phase equivalent circuit of the active capacitor of FIG. 2;

FIGS. 5A-5C depict stability analysis models. FIG. 5A is an equivalent circuit for representing CM noise propagation; FIG. 5B is a schematic diagram of the LISN; FIG. 5C is a block diagram representing the equivalent circuit;

FIG. 9A is an equivalent circuit for representing CM noise propagation; FIG. 9B is a block diagram of the CM noise propagation circuit;

FIG. 11A is the CM inductance; FIG. 11B is the volume of ACFs with different numbers of stages; FIG. 11C relates to an optimal number of active capacitor stages;

FIG. 13A shows an embodiment of an active capacitor with an optional CM choke; FIG. 13B is the inside view of a laptop adaptor with ACF according to the present invention; FIG. 13C depicts the equipment used and connections to measure EMI;

FIG. 16A shows a CLC ACF of the present invention; FIG. 16B shows a commercial 1000 W power supply FIG. 16C shows a comparison of a passive filter and the invention; FIG. 16D shows a comparison of the volume of CM chokes;

DETAILED DESCRIPTION

Figures 1A, 1B:
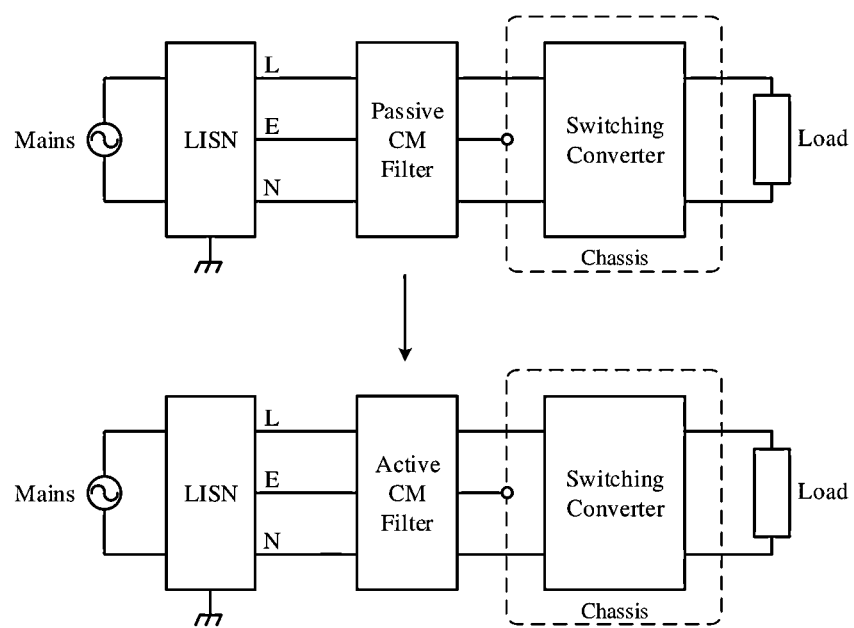
FIGS. 1A-1C show an overview of active capacitors and an active common mode filter according to the present invention.
Figure 1C:
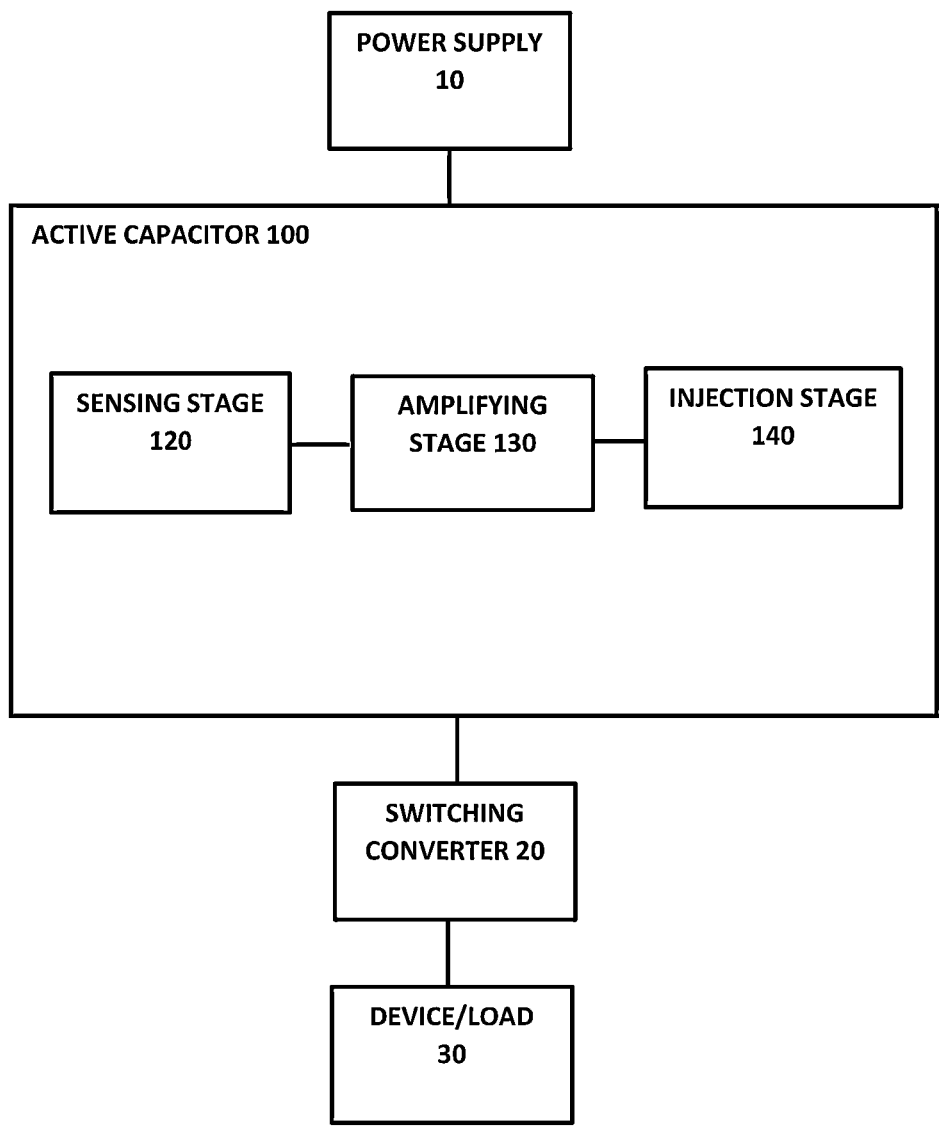

Turning to the drawings in detail, FIG. 1C depicts an overview of a system including a high-attenuation wideband active common-mode EMI filter section according to one aspect of the present invention. The filter section includes an active capacitor 100 positioned between a power supply 10 and a switching converter 10 connected to a device/load 30. The active capacitor 100 further includes a sensing stage 120, an amplifying stage 130, and an injection stage 140. FIG. 1B illustrates the replacement of a prior art passive CM filter with an active CM filter according to the present invention.

The active capacitor is constructed by a fixed capacitor C connected in series with a controllable voltage source, as shown in FIG. 1A which presents the operating principle of the active capacitor. The output voltage of the voltage source is derived from the terminal voltage vs with a frequency-dependent gain Gv(f). Thus, the equivalent capacitance Cact(f) is $$C_{act}(f)=[1-G_v(f)]C$$

where f is operating frequency.

A. Circuit Design of the Active Capacitor

Figure 2A:
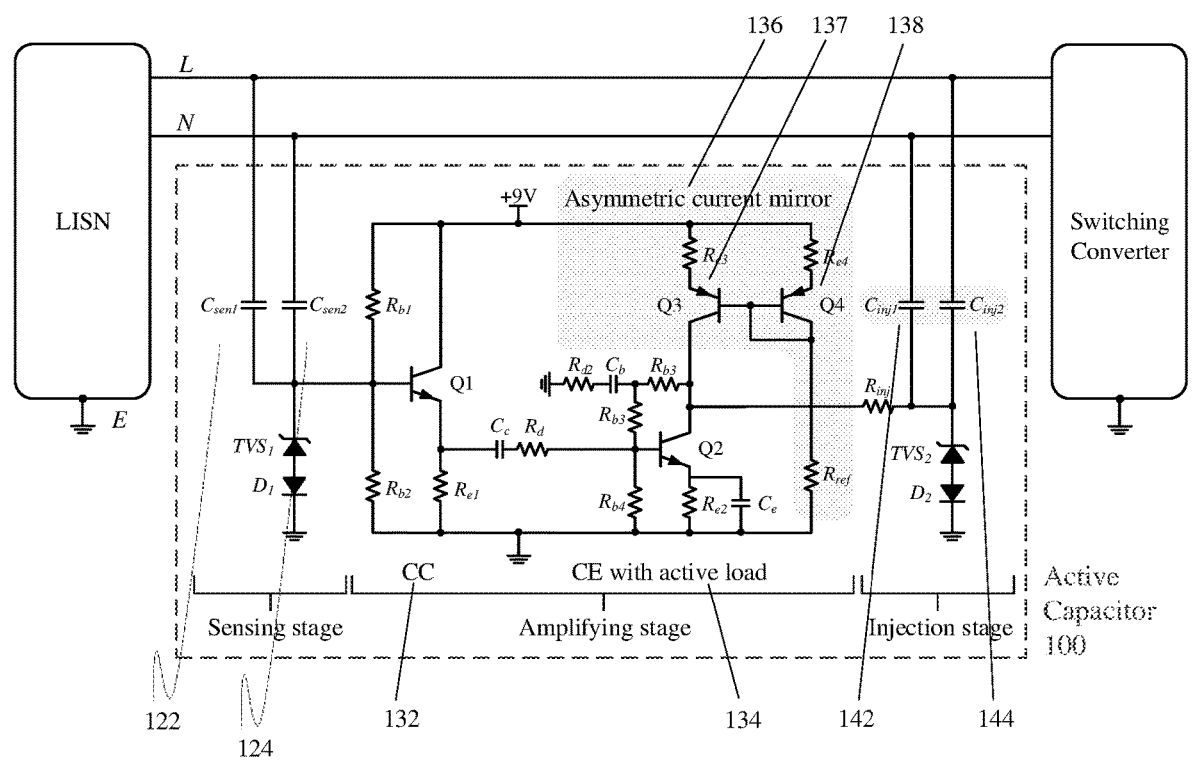
FIG. 2A-2B shows details of an active capacitor as a schematic diagram.
Figure 2B:
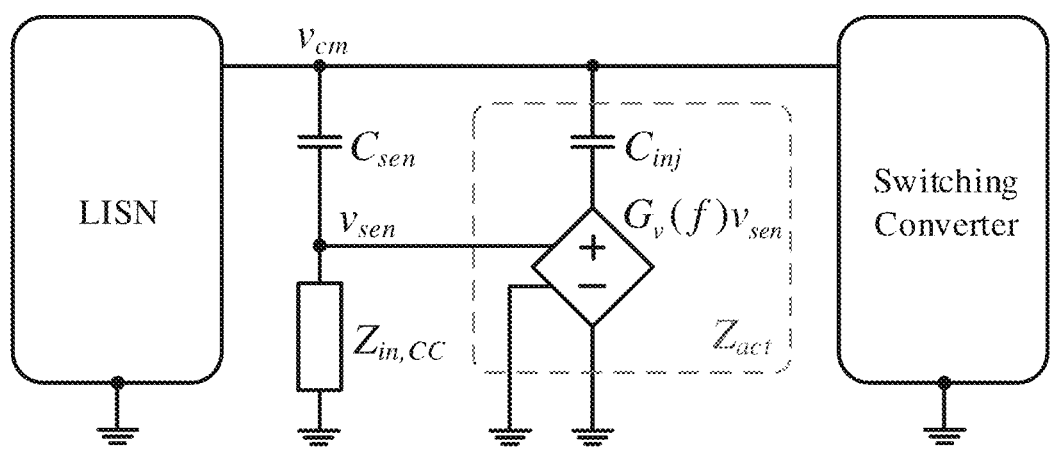

FIG. 2 shows the schematic diagram of the proposed active capacitor. The active capacitor consists of three parts: sensing capacitors, amplifying stage, and injection capacitors.

Capacitors $C_{sen1}$ 122 and $C_{sen2}$ 124 with identical capacitance in the sensing stage sense the common-mode noise voltage. The amplifying stage is the implementation of the controllable high-frequency voltage source in FIG. 1A. The injection capacitors, $C_{inj1}$ 142 and $C_{inj2}$ 144, are of the same value, and circulate the majority CM noise current in the injection stage. Consequently, the CM noise flowing into the line impedance stabilization network (LISN) is highly reduced. Furthermore, transient-voltage-suppression (TVS) diodes (SMAJ13A) and small-signal fast switching diodes (1N4148), D1, are used to protect the amplifying stage from high voltage transients.

Since the total Y-capacitance ($C_{sen}$ and $C_{inj}$) is restricted, the sensing capacitors have small capacitances. Thus, their impedances are large. The common collector amplifier (CC amplifier 132), having high input impedance, avoids attenuating the CM voltage appeared at the input of the high-gain common emitter amplifier (CE amplifier 134).

In conventional CE amplifiers, using a large collector resistor can attain a high voltage gain. However, the use of a large collector resistor requires a high voltage supply and leads to more power consumption, limiting the value of the collector resistor and the gain. A current mirror, 136 which acts as an active load, is used to provide a large equivalent resistance. Moreover, the active load is in asymmetric configuration; transistor Q4 138 has a much smaller quiescent current than Q3 137. Thus, the power dissipation of the active capacitor 100 can be reduced by one-half, as compared with the symmetric configuration.

Figure 3B:
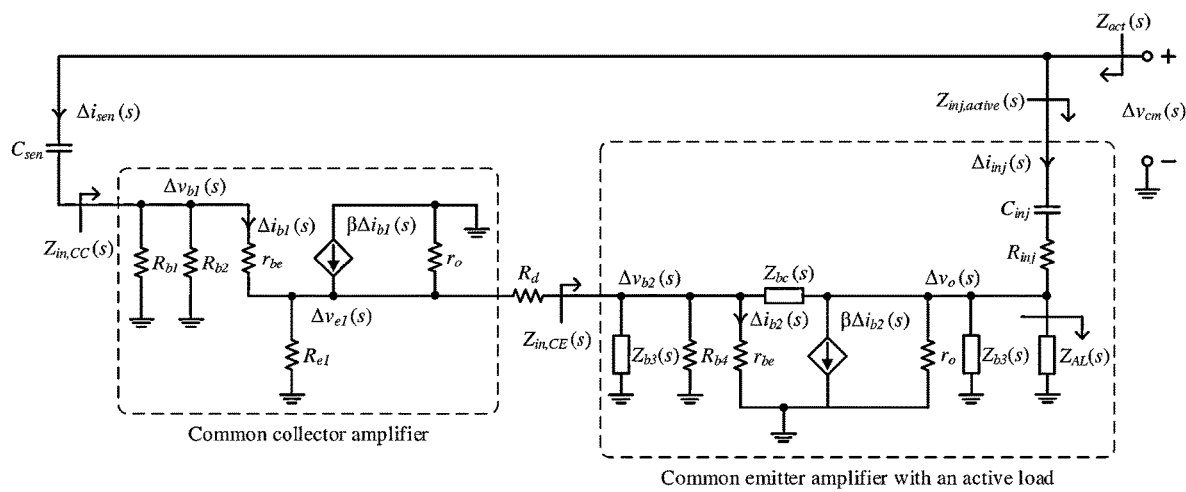
Figure 3B:
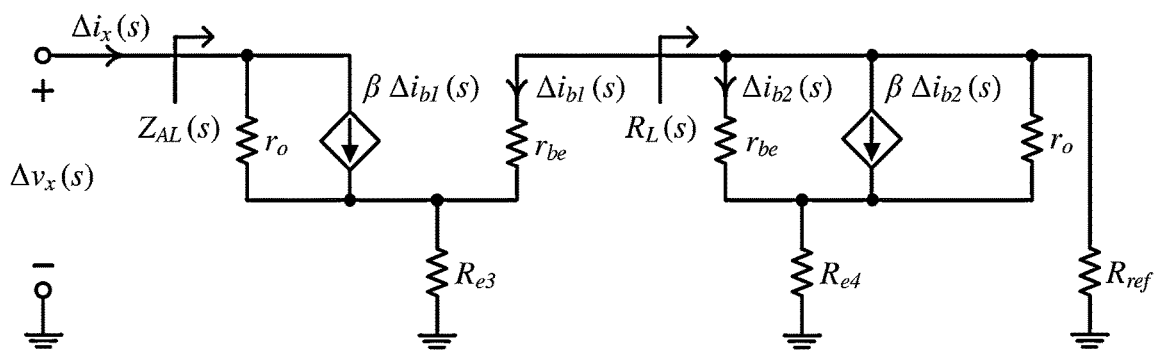

FIG. 3 shows the single-phase equivalent circuit for the active capacitor 100. $Z_{in,CC}$ represents the input impedance of the CC amplifier. At low-frequency, $v_{sen} \approx 0$, and $Z_{act} = Z_{Cinj}$; at high-frequency, $v_{sen} \approx v_{cm}$, and $Z_{act} = Z_{Cinj}/[1-G_v(f)]$.

Figure 4:
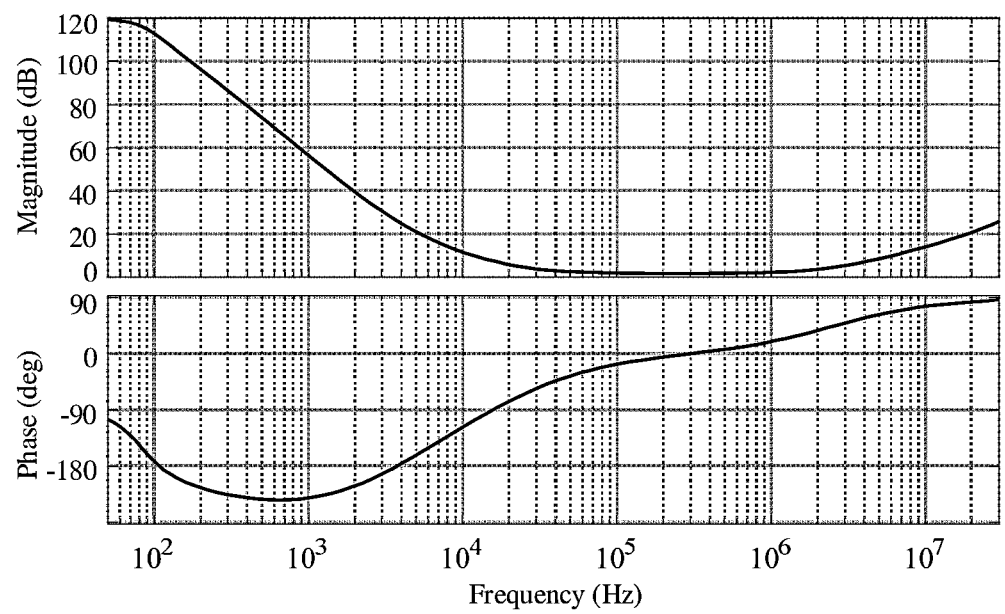
FIG. 4 depicts the impedance characteristics of the active capacitor.

The impedance characteristics of the proposed active capacitor $Z_{act}(s)$ is shown in FIG. 4 with the values given in Table II.

TABLE II

PARAMETERS OF THE ACTIVE CAPACITOR

| Parameter | Value | Parameter | Value |
|---|---|---|---|
| $C_{sen1}$, | 330 pF | $C_b$ | 100 nF |
| $C_{inj1}$, $C_{inj2}$ | 2.2 nF | $R_{d2}$ | 1 kΩ |
| $R_{b1}$ | 75 kΩ | $R_{e2}$, $R_{e3}$ | 10 Ω |
| $R_{b2}$ | 100 kΩ | $C_e$ | 20 μF |
| $R_{e1}$ | 2 kΩ | $R_{e4}$ | 220 Ω |
| $C_c$ | 10 μF | $R_{ref}$ | 5.1 kΩ |
| $R_d$ | 100 Ω | $R_{inj}$ | 2 Ω |
| $R_{b3}$ | 12 kΩ | Q1, Q2 | 2SCR293P5 |
| $R_{b4}$ | 8.2 kΩ | Q3, Q4 | 2SAR293P5 |

B. Stability of the CM Noise Circuit with the Active Capacitor

FIG. 5A shows the equivalent circuit for representing the CM noise propagation with the proposed active capacitor. The pulsating CM voltage source $V_s(s)$ generates noise current $I_n(s)$ through a capacitor $C_p$. $C_p$ is the parasitic capacitance between switching nodes attached to heatsinks and the earth, which is much smaller than the active capacitor. Thus, the CM noise source can be regarded as a current source $I_n(s)$ due to its high output impedance characteristics.

The LISN used in the Example below is ETS-Lindgren 4825/2. Its simplified schematic diagram is shown in FIG. 5B and the block diagram of the equivalent circuit is shown in FIG. 5C. It meets the requirements stipulated in CISPR 16-1.

Based on the block diagram of the equivalent circuit shown in FIG. 5C, the loop gain of the CM circuit $G_L(s)$ is $$G_L(s) = \frac{Z_{LISN}(s)}{Z_{act}(s)}$$

Figure 6:
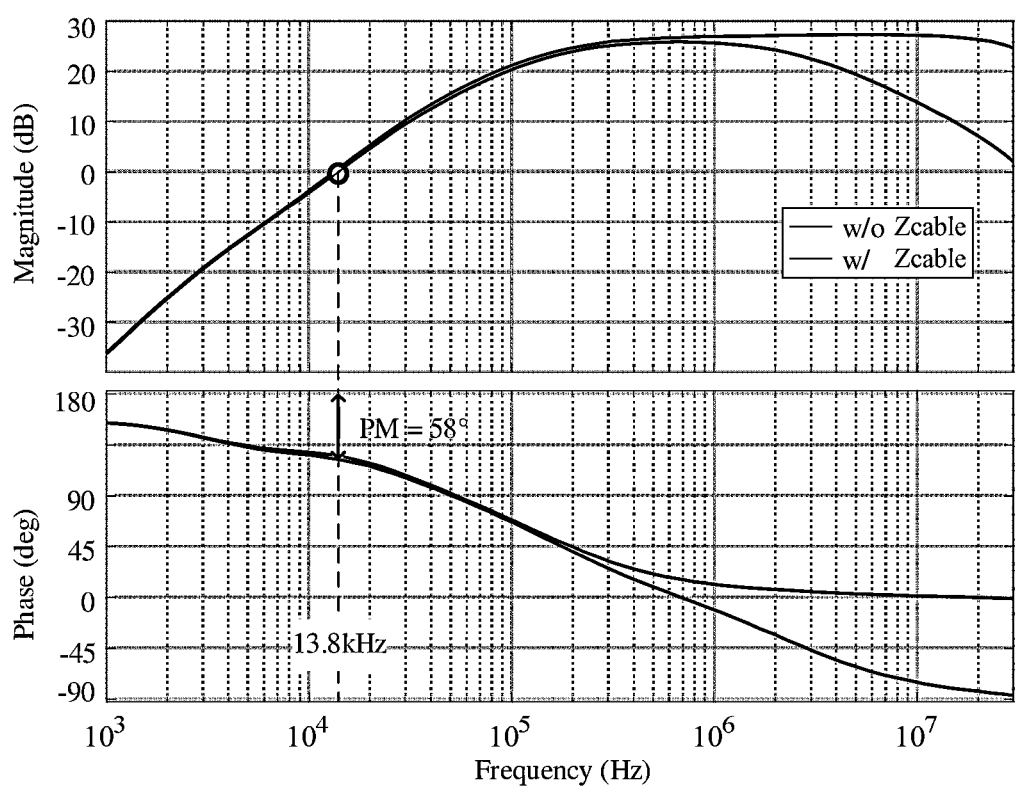
FIG. 6 depicts the loop gain of the CM circuit with the active capacitor.

Based on the above, the Bode plots of $G_L(s)$ is shown by the solid line in FIG. 6. $G_L(s)$ crosses the 0-dB axis at 13.8 kHz with a phase margin of 58°.

C. Effect of Supply Cable Impedance

The converter is connected to the LISN via a supply cable, which has an impedance of $Z_{cable}(s)$ in series with $Z_{LISN}(s)$. For example, a 1 m long three-wire cable has an inductance of 1.2 μH per wire. Thus, the inductance of the CM path caused by the cable is (1.2/2+1.2)μH=1.8 μH. With $Z_{cable}(s)$ taken into account, $G_L(s)$ is expressed as $$G_L(s) = \frac{Z_{LISN}(s) + Z_{cable}(s)}{Z_{act}(s)}$$

The Bode plots of GL(s) with $Z_{cable}(s)$ is shown by the dotted line in FIG. 6. This small cable inductance can increase the magnitude of $G_L(s)$ in the high-frequency range.

Another important consideration is the output voltage swing of the active capacitor. The output voltage swing can be derived from the circuit shown in FIG. 2.

Figure 7:
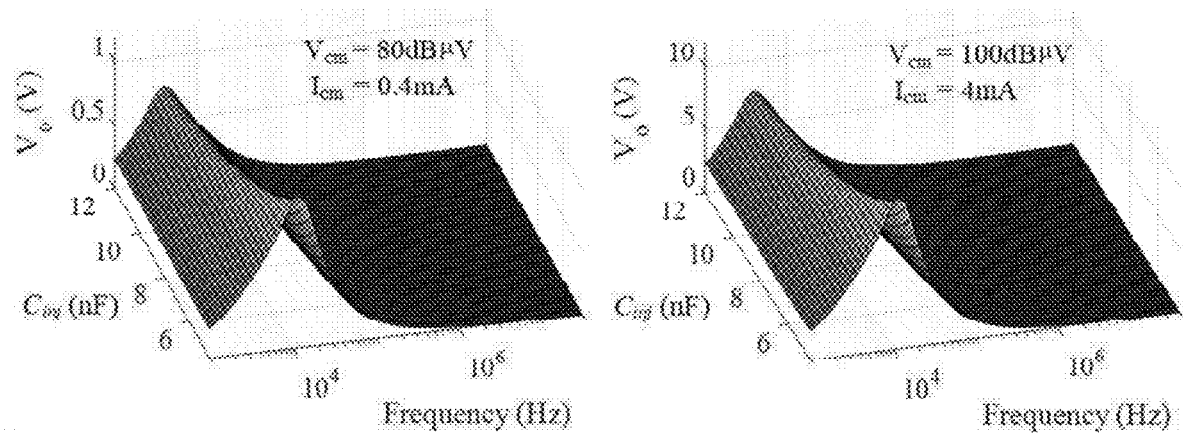
FIG. 7 is the frequency response of $\Delta v_o$.

The output voltage swing $\Delta v_o$ is dependent on the noise level. If the maximum CM noise voltage $V_{cm}(s)$ measured by the LISN is 80 dBμV, the magnitude of the corresponding noise current $\Delta i_n(s)$ is 0.4 mA (80 dBμV/25 ohm). Taking the variation of the injection capacitance $C_{inj}$ into account, the frequency response of $\Delta vo$ is shown in FIG. 7. $\Delta vo$ is maximum when there is resonance between Zact(s) and ZLISN(s). Its magnitude will decrease with the increase in Cinj. Since the switching frequency is usually higher than tens of kilo-Hertz, this peak voltage can be avoided. Compared with the typical value of Vcc (±15V or +30V) in the prior art, Vcc is set at a much lower level at 9V to reduce power dissipation.

D. Insertion Loss of the Active Capacitor

The insertion loss of the active capacitor ILact(s) is calculated by the ratio of the noise voltage across the LISN without and with the active capacitor, as illustrated in FIG. 5A.

Based on FIG. 5A, without the active capacitor, the noise voltage $V_{cm}$ is $V_{cm}'$. It can be shown that:

$$V'_{cm}(s) = \frac{Z_{LISN}}{Z_{C_p}(s) + Z_{LISN}(s)} V_s(s)$$

With the active capacitor connected, $$V_{cm}(s) = \frac{Z_{LISN}(s) \| Z_{act}(s)}{Z_{C_p}(s) + Z_{LISN}(s) \| Z_{act}(s)} V_s(s)$$

Considering that $z_{LISN}(s) << Z_{C_p}(s)$, $$IL_{ac}(s) = \frac{V'_{cm}(s)}{V_{cm}(s)} = \frac{1 + \frac{Z_{LISN}(s)}{Z_{act}(s)}}{\frac{Z_{LISN}(s)}{Z_{C_p}(s)}} + \frac{Z_{LISN}(s)}{Z_{C_p}(s) + Z_{LISN}(s)}$$

$$\approx 1 + \frac{Z_{LISN}(s)}{Z_{act}(s)}$$

$$= 1 + G_L(s)$$

Figure 8:
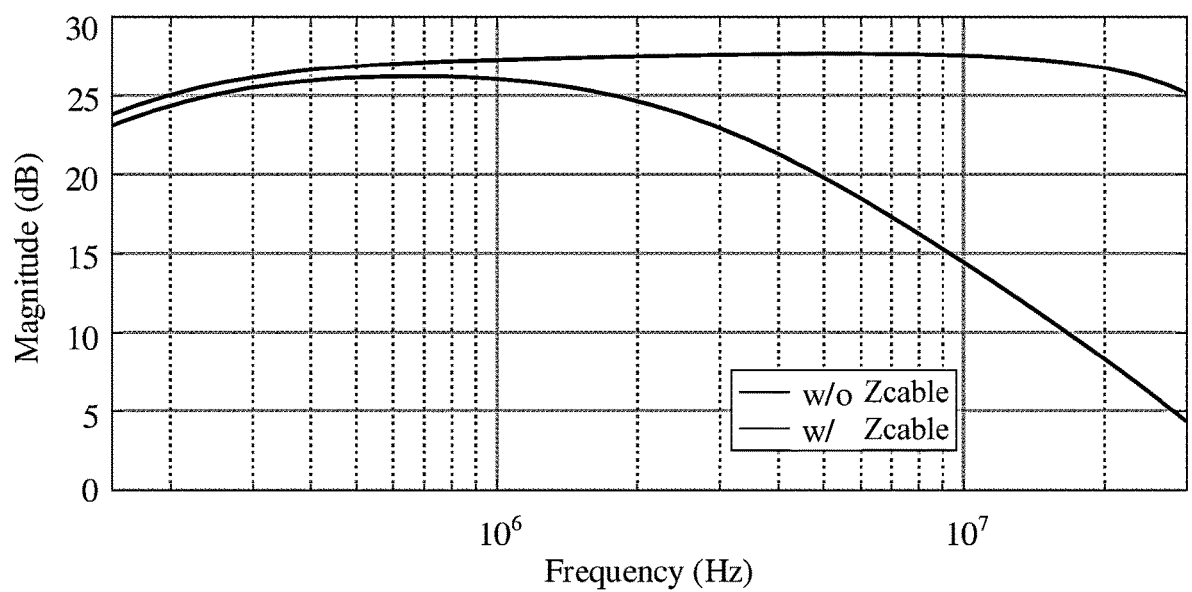
FIG. 8 depicts the insertion loss of the active capacitor.

Hence, a high loop gain $G_L(s)$ is the key factor to increase the insertion loss of the active capacitor. The insertion losses of the active capacitor with and without $Z_{cable}(s)$ included are shown in FIG. 8.

Multistage Active CM filter

Figure 9A:
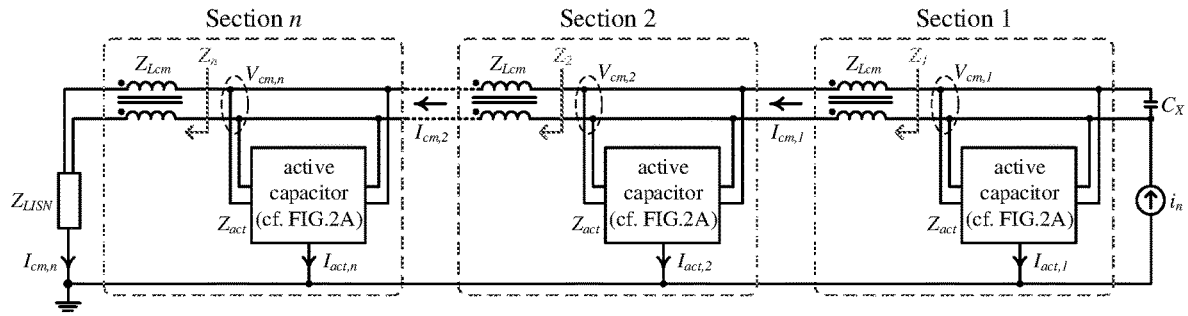
FIG. 9A-9B relate to a multistage ACF.

When high attenuation is needed, multiple active capacitors can be cascaded with CM inductors to form a multistage ACF in another aspect of the present invention. FIG. 9A depicts a multistage filter according to an embodiment. Based on the impedance mismatch principle of filter design, the low impedance element Z a should be placed close to the high impedance CM noise source, as shown in FIG. 9A with the CM inductors modeled by inductor $Z_{Lcm}$.

Multistage Active CM Filter Design

Figure 9B:
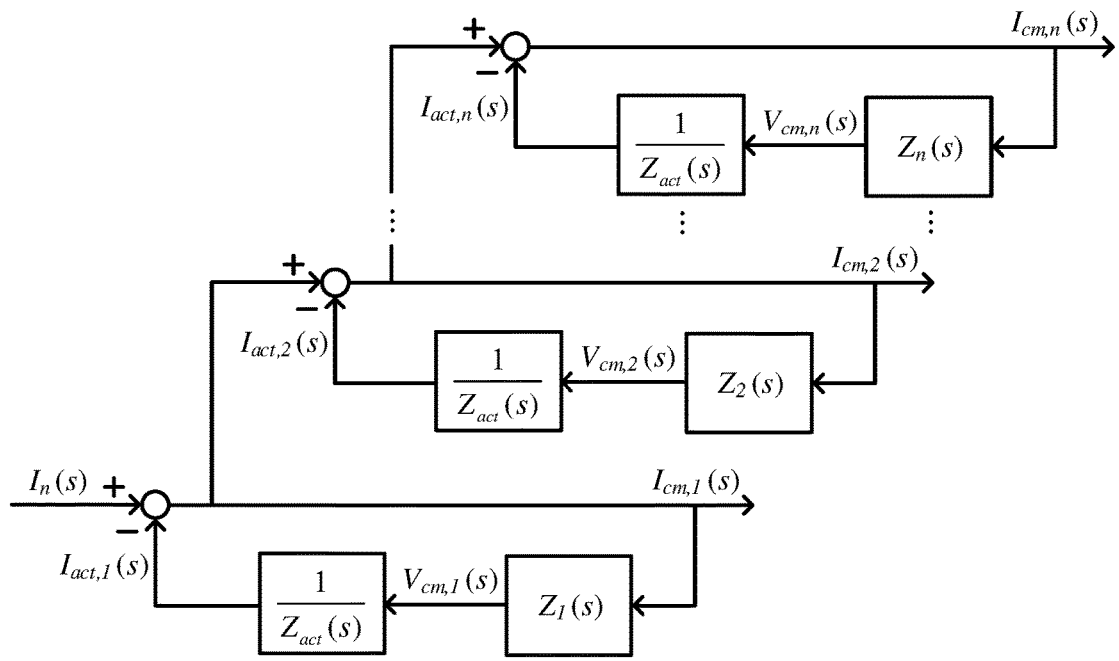

The stability of the CM circuit with the multistage ACF is analyzed. Based on the model given in FIG. 9B, the loop gain of filter section n $G_{Lact,n}(s)$ is:

$$G_{L,act,n} = \frac{Z_n(s)}{Z_{act}(s)}$$

The ACF is proposed to minimize the required inductor value. For an ACF using two active capacitors, at least one CM choke is required. Hence, a CLC ACF, which includes two active capacitors and a CM choke, has been investigated. This structure is a variation of the standard two-stage ACF shown in FIG. 9A.

As shown in FIG. 9A, majority noise current $I_n(s)$ is firstly circulated through the stage-I active capacitor, and then part of the residual noise current circulates through the stage-II active capacitor. Thus, the current flowing through the LISN is significantly reduced. Since the amplifying stage of the active capacitors is a class-A amplifier, it is important to set an appropriate quiescent current to avoid cut-off distortion. Hence, the quiescent current of stage I, $I_{CQ,1}$, is higher than that of stage II, $I_{CQ,2}$. The other parameters of the two active capacitors remain the same. Hence, the two active capacitors share the same small-signal model that facilitates the analysis and design of the CLC ACF.

The loop gain of each stage can be shown to be:

$$G_{L,act,1} = \frac{Z_{Lcm}(s) + Z_{LISN}(s) \| Z_{act}(s)}{Z_{act}(s)}$$

$$\approx \frac{Z_{Lcm}(s) + Z_{LISN}(s)}{Z_{act}(s)}$$

$$G_{L,act,2} = \frac{Z_{LISN}(s)}{Z_{act}(s)}$$

where $Z_{Lcm}(s)$ is the impedance of the CM inductor. The value of $Z_{Lcm}$ is very small. A 16 µH CM inductor is used in the Example, below.

For $Z_{Lcm}(s) + Z_{LLSN}(s) \| Z_{act}(s)$, the low-frequency impedance is determined by $Z_{LISN}(s)$ and the high-frequency impedance is determined by $Z_{Lcm}(s)$; hence, $Z_{Lcm}(s) + Z_{LLSN}(s) \| Z_{act}(s) \approx Z_{Lcm}(s) + Z_{LISN}(s)$. The stability of the two ACF sections is decoupled. The decoupled stability of ACFs can also be extended to more stages with the model introduced in FIG. 9B. This characteristic makes multistage ACF design more convenient.

Figure 10:
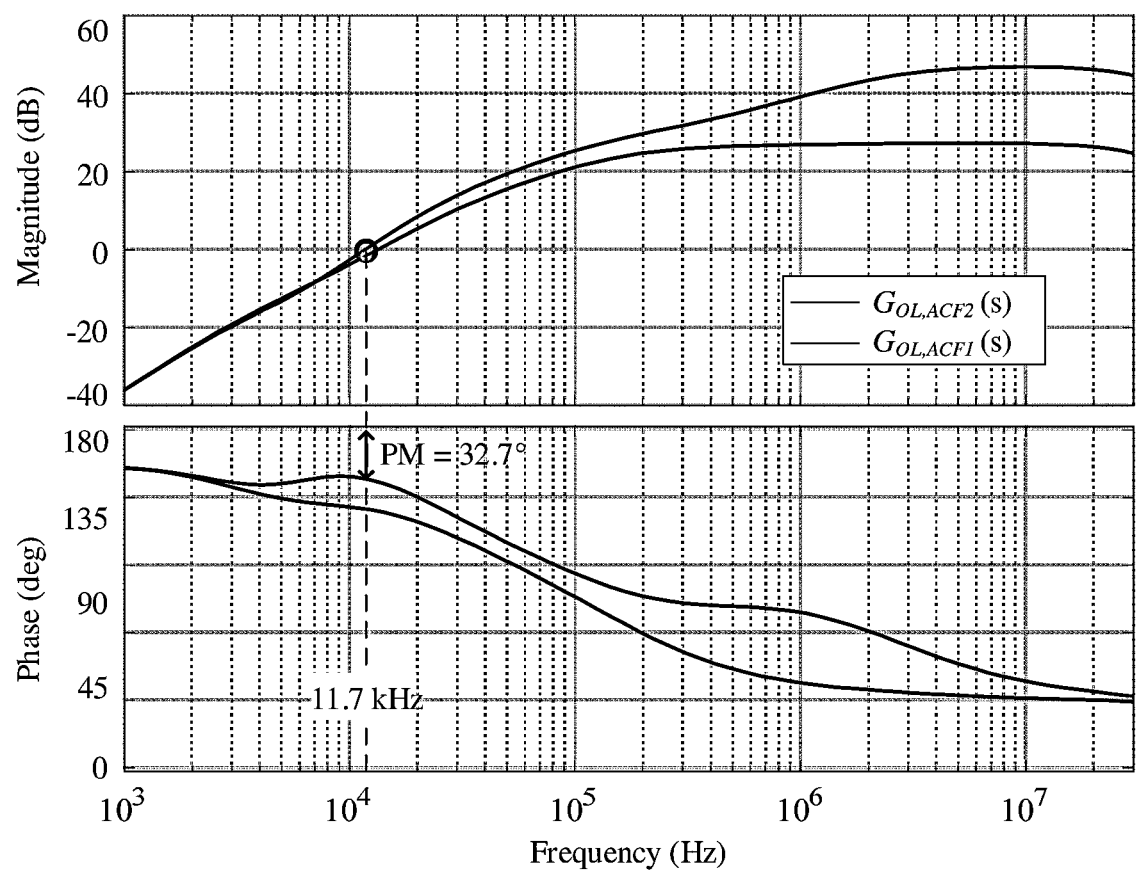
FIG. 10 is the loop gain of the CM circuit with the CLC ACF.

The Bode plots of $G_{L,act,1}(s)$ and $G_{L,act,2}(s)$ are shown in FIG. 10 with $Z_{cable}(s)$ taken into consideration. $G_{L,act,2}(s)$ is the same as the loop gain of the single active capacitor given above. $G_{L,act,1}(s)$ crosses the 0-dB axis at 11.7 kHz with a phase margin of 32.7°, which is smaller than that of $G_{L,act,2}(s)$. A large CM inductance might lead to instability. Hence, a small CM inductance is conducive to reducing volume and enhancing stability.

Number of Filter Sections

The analysis above shows the viability of using multistage ACF to achieve higher noise attenuation. An optimal number of filter sections that satisfy the required attenuation and have the smallest volume is determined. In order to achieve a specific attenuation at the design frequency, filters with different numbers of LC-stage are designed. Note that, as used herein, the term "optimal" relates to a specific application (e.g., for different frequencies), hence there may be many "optimal" designs for different applications according to the present invention.

The design frequency is set at 150 kHz, where the conducted EMI frequency starts.

Figure 11A:
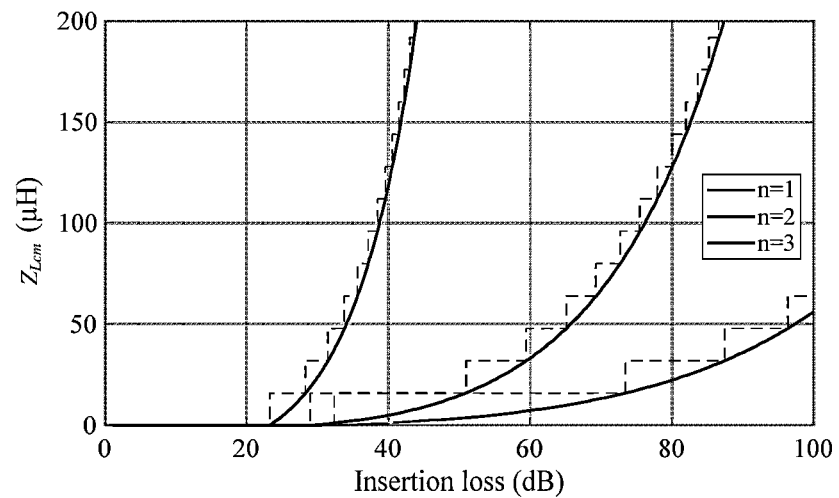
FIGS. 11A-11C depict the optimization of active capacitor stages for required insertion loss.

The relationships between the required CM inductance and the insertion loss with n=1, 2, and 3 are given in FIG. 11A.

Figure 11B:
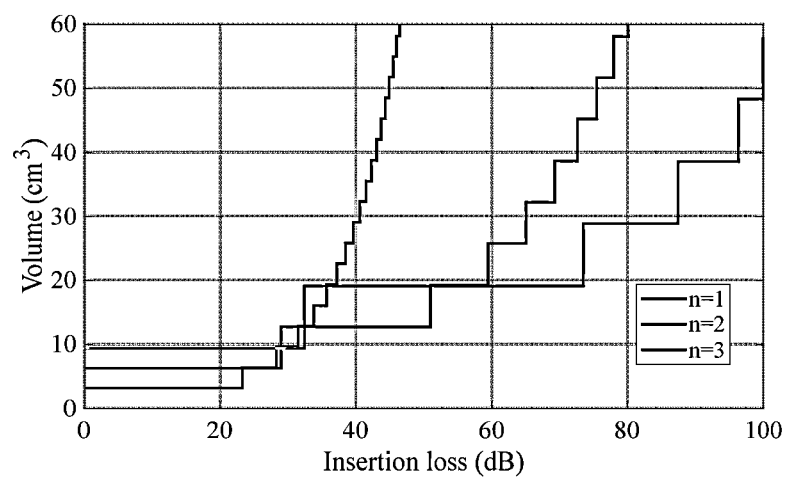

The next step is to translate the required CM inductance into the volume of the CM choke. For the sake of comparison, a 10A, 16 µH CM choke with small DC resistance and good high-frequency response manufactured by Wurth Electronics (part no.: 7448421016) is taken as the basic unit for fabricating the required value of CM inductor. A PCB volume of an active capacitor section (3 cm×2.1 cm×0.5 cm=3.15 cm³) is taken into account. The relationships between the volume and the insertion loss with n=1, 2, and 3 are shown in FIG. 11B.

Figure 11C:
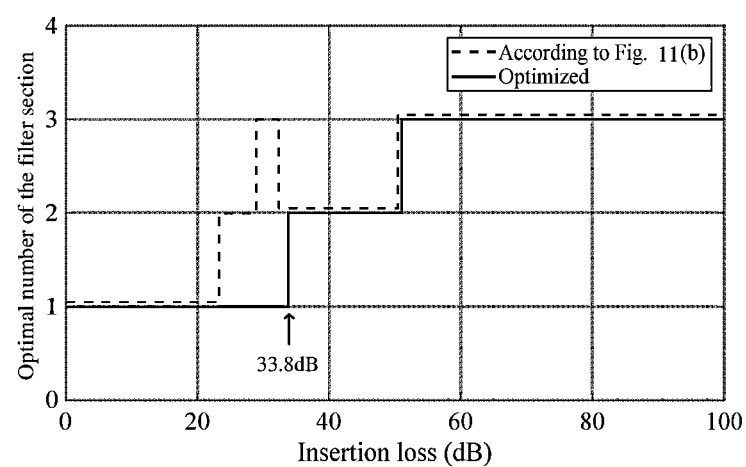

By comparing the volume curves of the multistage ACFs, the optimal number of ACF sections is derived and is shown in FIG. 11C (dotted line). When the required attenuation is below 33.8 dB, the single-stage structure is sufficient and cost-effective. Hence, the optimal number of ACF sections is modified, as shown by the solid line FIG. 11C.

Figure 12:
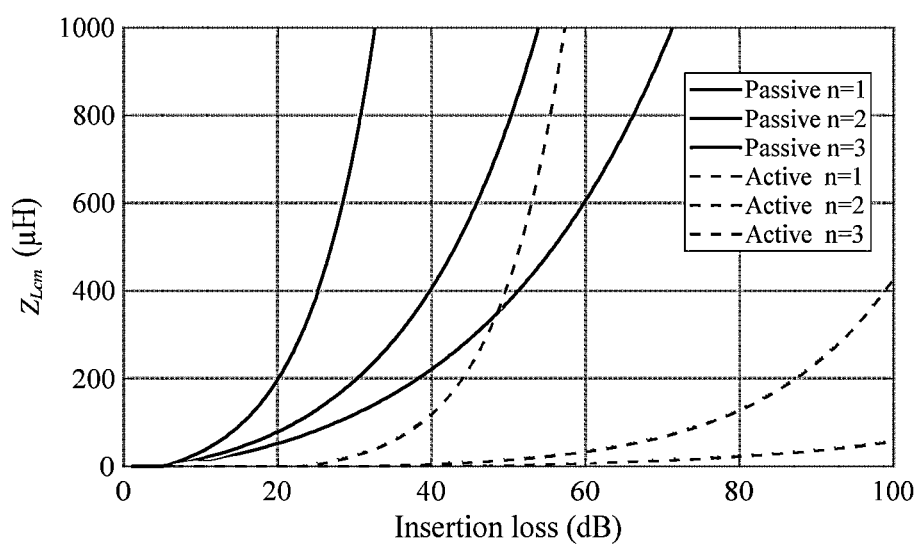
FIG. 12 is a comparison of CM inductance curves of multistage CM passive filters and active filters.

If the active capacitors in FIG. 9A are replaced by Y-capacitors, the insertion losses of passive multistage CM filters are derived. A comparison of the required $Z_{Lcm}$ is shown in FIG. 12. By using the proposed ACF, the required CM inductances are significantly reduced.

EXAMPLE

The performance of single-stage and two-stage ACFs is evaluated on two commercial power supplies with rated power of 90 W for laptop adaptor and 1000 W power supply for industrial applications.

A. Commercial 90 W Laptop Adaptor

Figure 13A:
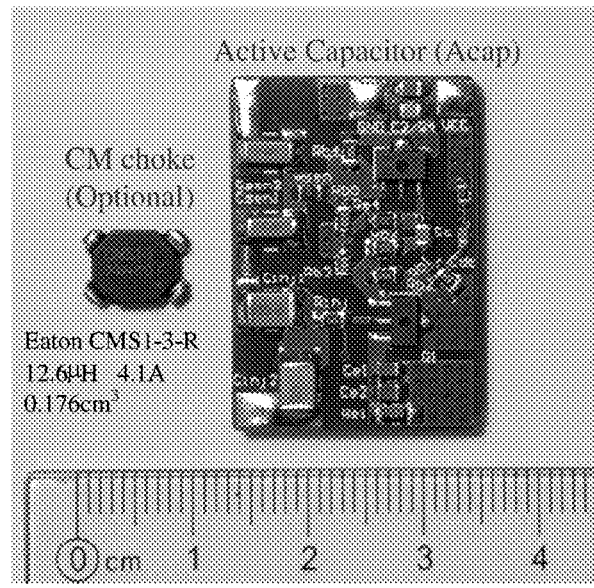
FIGS. 13A-13C depict the experimental set-up for EMI measurement.
Figure 13B:
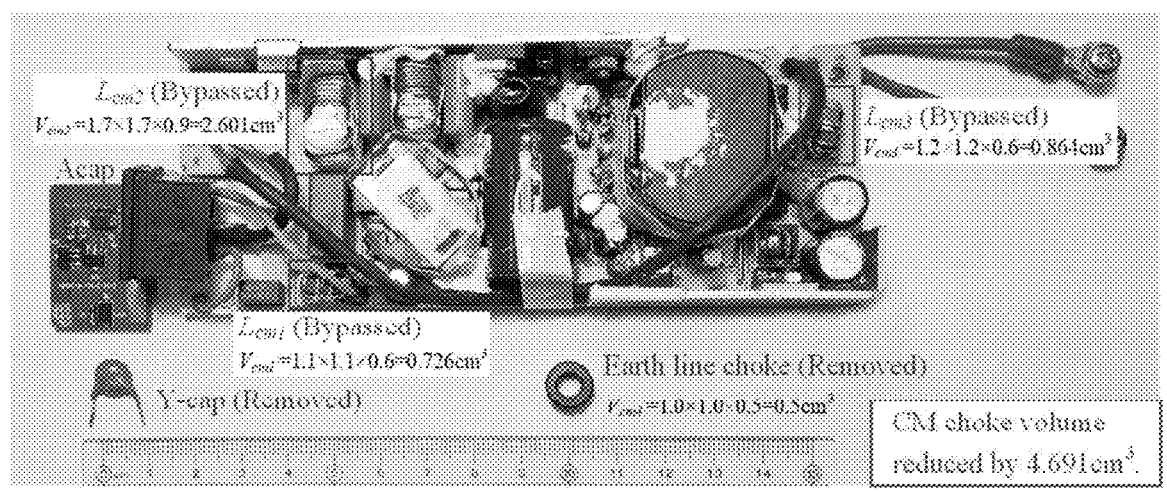
Figure 13C:
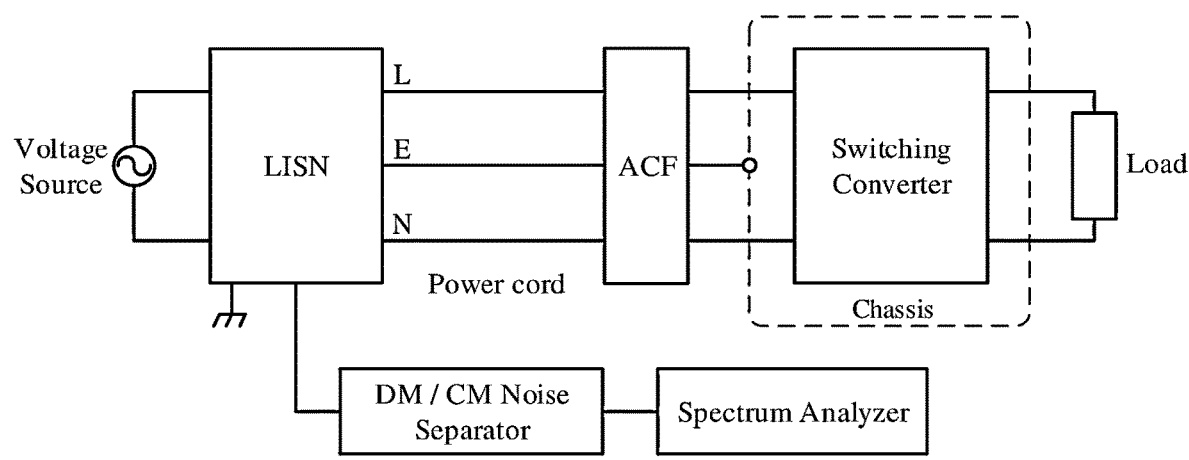
Figure 14A:
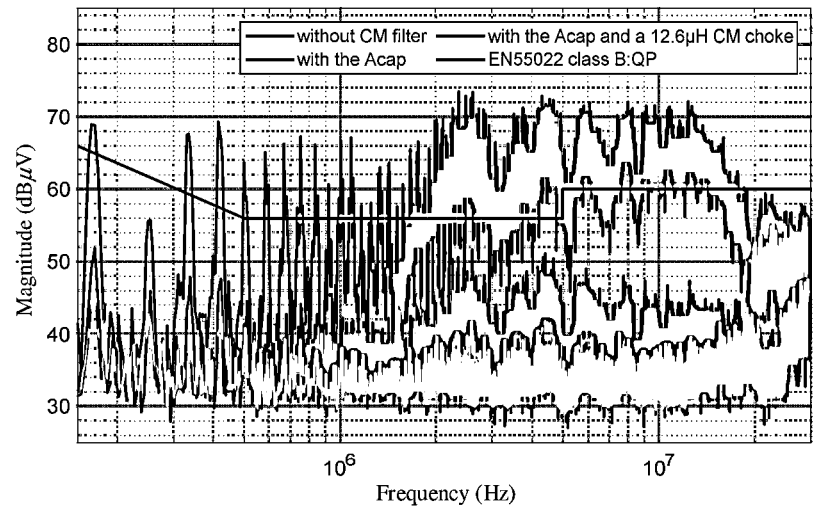
FIGS. 14A-14B depict the measured peak CM noise of a 90 W laptop adaptor at 115 v (FIG. 14A) and 230 v (FIG. 14B)
Figure 14B:
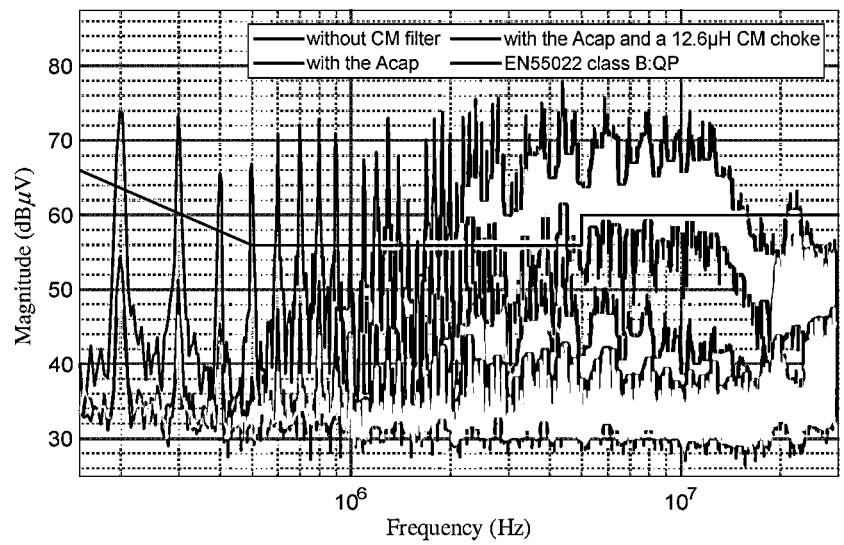
Figure 15:
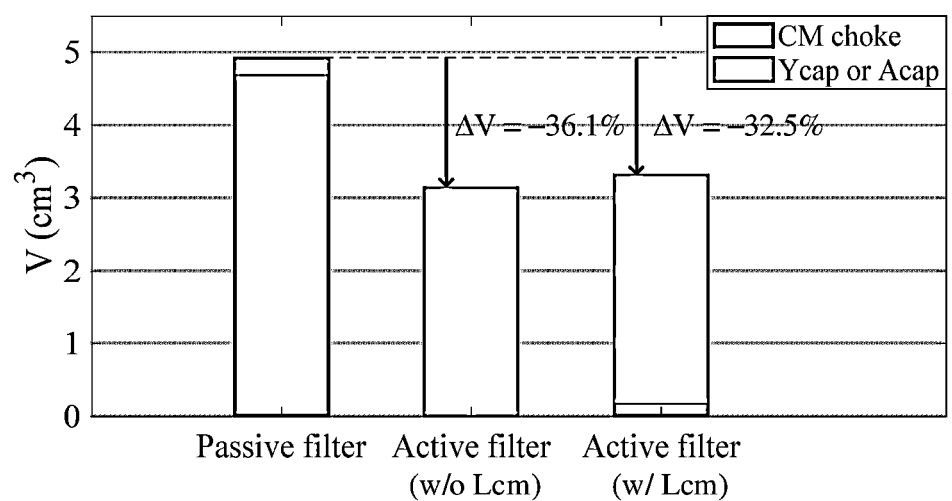
FIG. 15 depicts a volume comparison of a passive CM filter and an ACF of the present invention.

A single-stage ACF according to the present invention has been applied to a commercial 90 W laptop adaptor. The photos of the proposed active capacitor, laptop adaptor, and connections of EMI measurement equipment are shown in FIGS. 13A-13C. The original CM chokes of the laptop adaptor are bypassed, and the Y-capacitor is removed to test the ACF. The CM noise of the laptop adaptor without any CM filter, with the active capacitor (A-cap), and with both active capacitor and a 12.6 pH CM choke are measured under low- and high-line conditions, as shown in FIGS. 14A-14B. By using the proposed active capacitor, the CM spectra are below the limit line as stipulated in EMC standard EN55022 class B. An optional 12.6 pH CM choke can further attenuate high-frequency noise. As shown in FIG. 15, the overall CM filter volume can be reduced by 36.1% without the CM choke and 32.5% with the CM choke. Since the PCB board dominates the ACF volume, further volume reduction can be expected by placing the components of the active capacitor in the adaptor or implementing it with monolithic integration.

The sensing capacitance of the active capacitor is 330 pF×2=660 pF, and the injection capacitance is 2.2 nF×2=4.4 nF. The leakage current is 0.38 mA at 240 Vac, 50 Hz, which is below the limit of 0.75 mA for hand-held information technology (TT) equipment stated in IEC 60950-1.

B. Commercial 1000 W Power Supply

Figure 16A:
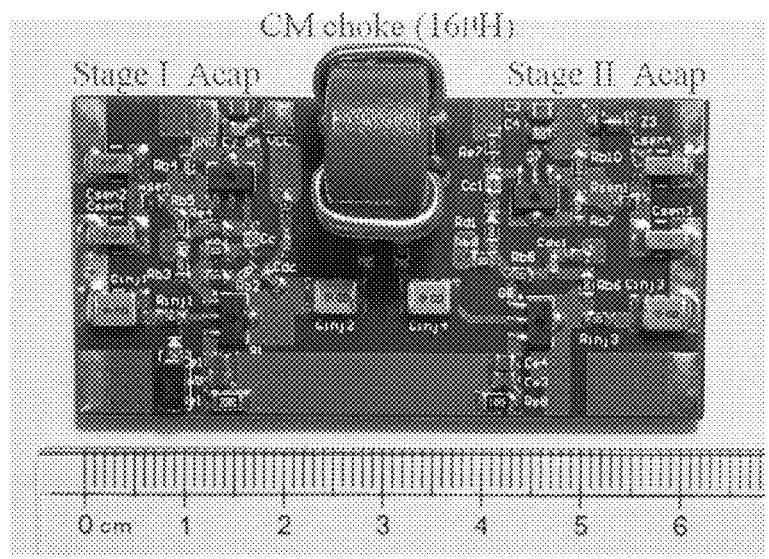
FIGS. 16A-16D depict the devices used in EMI measurements.
Figure 16B:
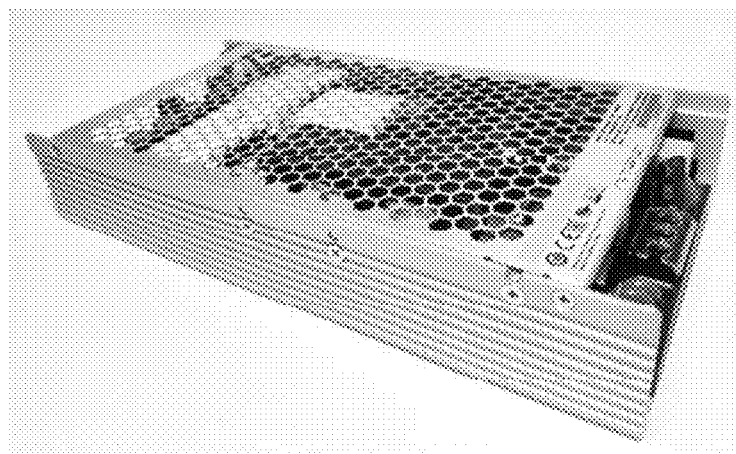
Figure 16C:
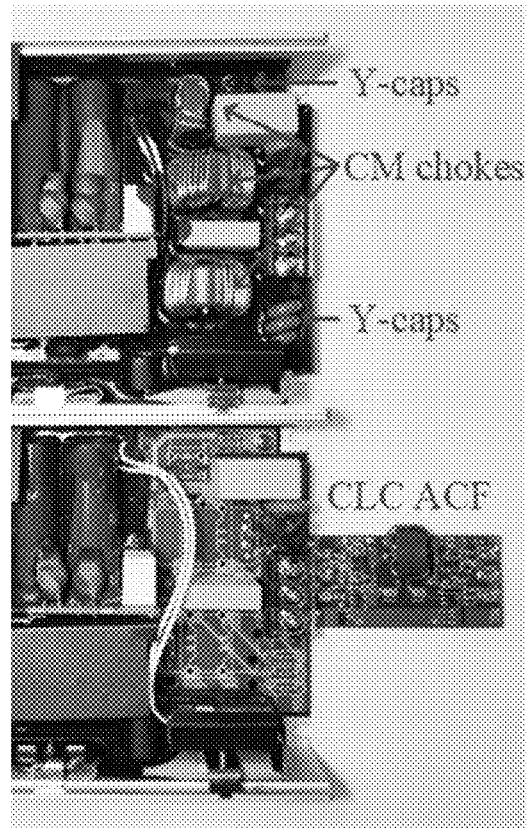
Figure 16D:
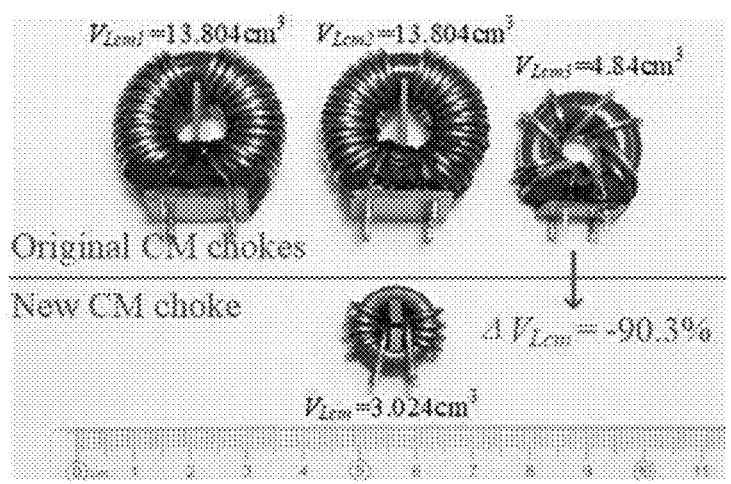

The proposed CLC ACF has been applied to a commercial 1000 W power supply which has universal input and 48 Vdc output voltage. The photos of the CLC ACF and the 1000 W power supply are shown in FIG. 16A-16B. The comparison of the converter with the original passive filter and the proposed CLC ACF is shown in FIG. 16C. The comparison of the volume of CM chokes is shown in FIG. 16D. The CM choke volume is reduced by 90.3%, and the overall CM filter volume has been reduced by 71.5%.

Figure 17A:
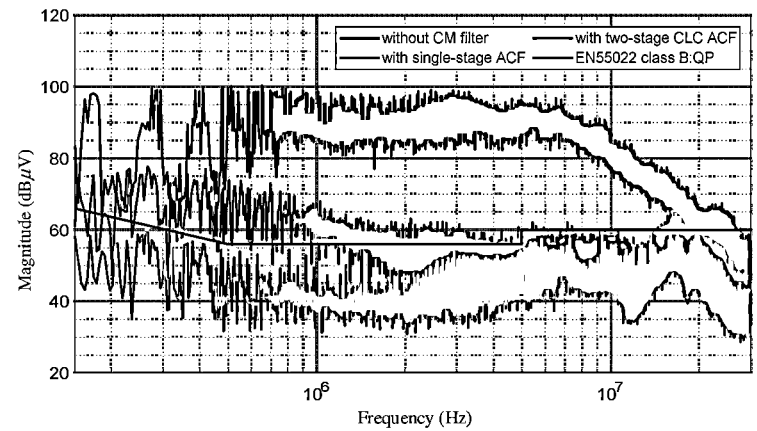
FIGS. 17A-17B depicts the measured peak CM noise of a 1000 W power supply at 115 V (FIG. 17A) and 230V (FIG. 17B)
Figure 17B:
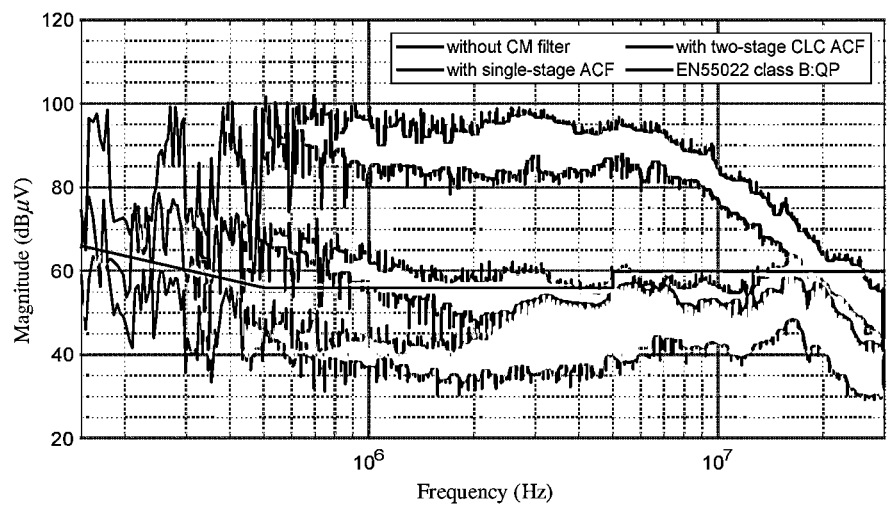

The CM noise measurements of the 1000 W supply without a CM filter, with a single-stage ACF (an active capacitor and a 16 pH CM choke), and with the two-stage CLC ACF, are conducted under low- and high-line condition. The results are shown in FIGS. 17A-17B. The CM spectra of the power supply with the CLC ACF satisfy the EMC standard EN55022 class B.

Figure 18:
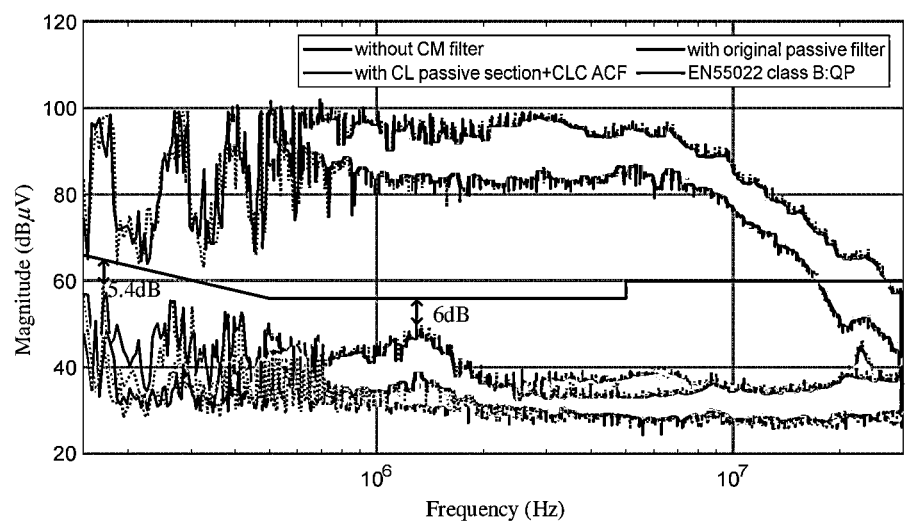
FIG. 18 shows the measured peak CM noise of the 1000 W power supply.
Figure 19:
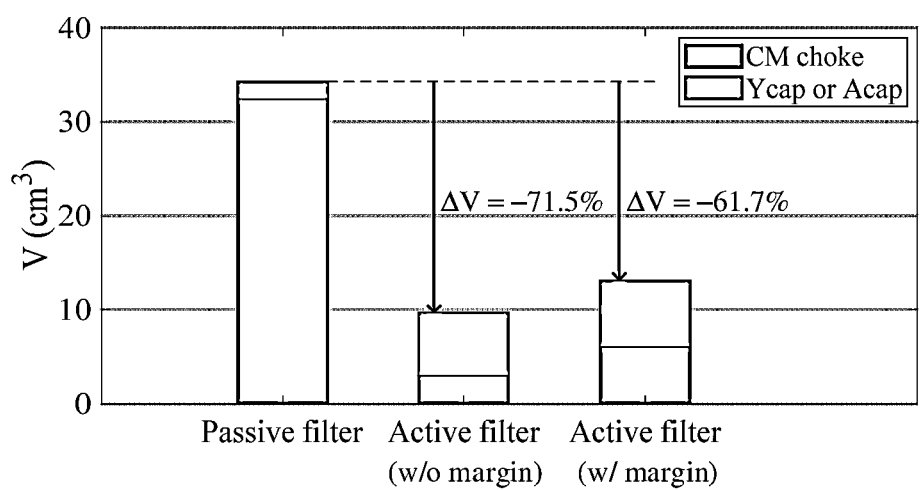
FIG. 19 depicts a volume caparison of a passive filter and the filter of the present invention.

In order to make a fair comparison of filter volume, the proposed ACF should have similar filtering attenuation to the original passive filter. Since the CM spectra of the converter with the CLC ACF are already below the limit line, there is no need to add one more active section. Instead, an LC passive section, which has 16 pH CM inductance and 4.4 nF Y-capacitor, is added between the converter and the CLC ACF to further increase noise attenuation, particularly in the high-frequency range. The CM spectra of the power supply with the LC passive section and the CLC ACF are measured and compared with the results of the original passive filter, as shown in FIG. 18. The dotted line and the solid line present the results under low- and high-line conditions, respectively. The CM spectra with the proposed ACF and the original passive filter have a similar margin of around 6 dB. Taking the volume of the LC passive section into account, a fair comparison with the original passive filter can be obtained. The physical volume of the CM filter has been reduced by 61.7%, as shown in FIG. 19.

The total sensing capacitance of the CLC ACF is 330 pF-2×2=1.32 nF, and the total injection capacitance is 4.7 nF×2×2=18.8 nF; the additional Y-capacitance is 4.4 nF. The leakage current is 1.85 mA at 240 Vac, 50 Hz, which is below the limit of 3.5 mA for movable or stationary IT equipment stated in IEC 60950-1.

The CM inductance reduction also contributes to the reduction of DC resistance Rdc of CM chokes. By using a high-precision LCR meter (GW Instek LCR-819), the total Rdc, including the resistance in both windings, of the two 16 pH CM chokes is 4.4×2=8.8 mΩ, and the total Rdc of the original CM chokes is 5.6 mΩ+35.8 mΩ+31.6 mΩ=73 mΩ, which will result in 5.52 W power loss at low-line and 1.38 W power loss at high-line with 1000 W input power. A comparison of power dissipation in the original passive CM filter and the ACF of the present invention is shown in Table I. Due to the power loss reduction in the CM choke, the total power dissipation of the ACF is smaller than that of the passive CM filter.

TABLE I

COMPARISON OF POWER DISSIPATION IN THE PASSIVE AND ACTIVE CM FILTER.

| | Original CM Filter | Active CM Filter | | |
|---|---|---|---|---|
| $V_{in}$ | $P_{Lcm}$ (W) | $P_{Lcm}$ (W) | $P_{active}$ (W) | $P_{Total}$ (W) |
| 115 V | 5.52 | 0.665 | 1.206 | 1.871 |
| 230 V | 1.38 | 0.166 | 1.206 | 1.372 |

In the present invention, the amplifying stage of the ACF simplifies the configuration of IC Op-amps, that is, the CC amplifier and a CE class A amplifier with high linearity to mitigate the impacts of parasitic elements. Thus, the present invention has a wide bandwidth that covers the whole conducted EMI frequency range between 150 kHz and 30 MHz. The attenuation above 20 MHz still exists but is less significant.

Significant volume reduction has been achieved with the inventive ACF along with small CM inductance. The general multistage structure enables the ACF to be applied to various applications. By using more filter stages, higher attenuation can be achieved.

The Y-capacitance of the ACF is within the limit for safety requirements. The power dissipation of the ACF is comparable with that of conventional passive filters and only accounts for a small portion of the converter input power.

Considering that the CM noise power is much smaller than the converter input power, a class-A amplifier with higher linearity than commonly used class AB amplifiers is used, even though the latter has higher power efficiency than the former. The class-A amplifier consists of a CC and a CE amplifier, rather than using the configuration of IC Op-amps, which reduces the effects of the parasitic parameters among discrete components and increases the bandwidth up to 30 MHz. The high attenuation is achieved by the high-gain CE amplifier with an active load.

The present invention also applies an ACF to a multistage configuration for pursuing higher attenuation. The optimal number of ACF sections at a specific insertion loss has been given, which facilitates the design of ACFs for various applications. The design of the multistage ACF is to use minimal CM inductance and exploit the full potential of active devices; hence, significant CM filter volume reduction has been achieved. Further volume reduction may be achieved by monolithic integration. The power dissipation of the ACF is comparable with that of conventional passive filters and accounts for a small portion of the converter input power. The inventive ACF has been tested on two commercial products, a 90 W laptop adaptor and a 1000 W power supply. The EMI measurement results show the ACF is an effective solution for CM noise suppression.

The foregoing description of the present invention has been provided for the purposes of illustration and description. It is not intended to be exhaustive or to limit the invention to the precise forms disclosed. Many modifications and variations will be apparent to the practitioner skilled in the art.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. An active common mode filter configured to be positioned between a power supply and a switching converter coupled to a device or to a load for reducing common mode noise comprising:
   an active capacitor including:
      a sensing stage including one or more sensing capacitors;
      an amplifying stage including a common collector amplifier for mitigating an input voltage divider effect coupled to a common emitter amplifier for providing high gain and further comprising an asymmetric current mirror coupled to the common emitter amplifier;
      an injection stage including one or more injection capacitors.

2. The active common mode filter of claim 1, wherein the common collector amplifier is cascaded with the common emitter amplifier.

3. The active common mode filter of claim 1, wherein the sensing stage includes two capacitors with the same capacitance.

4. The active common mode filter of claim 1 wherein the injection stage includes two capacitors with the same capacitance.

5. A multistage active common mode filter configured to be positioned between a power supply and a switching converter coupled to a device or to a load for reducing common mode noise, comprising:
   a first stage including a first active capacitor and a first inductor to generate a first-filtered current from an input current supplied by the power supply, the first active capacitor including:
      a first sensing stage including one or more first sensing capacitors;
      a first amplifying stage including a first common collector amplifier coupled to
      a first common emitter amplifier;
      a first injection stage including one or more first injection capacitors;
   a second stage including a second active capacitor and a second inductor configured to generate a second-filtered current from the first-filtered current, the second active capacitor including:
      a second sensing stage including one or more second sensing capacitors;
      a second amplifying stage including a second common collector amplifier coupled to a second common emitter amplifier;
      a second injection stage including one or more second injection capacitors.

6. The multistage active common mode filter of claim 5, wherein the first and second common collector amplifiers are cascaded the first and second common emitter amplifiers, respectively.

7. The multistage active common mode filter of claim 5, wherein the first and second common emitter amplifiers are each a common emitter amplifier with active load.

8. The multistage active common mode filter of claim 5, wherein the each of the first and second amplifying stages further comprises an asymmetric current mirror coupled to the first and second common emitter amplifiers, respectively.

9. The multistage active common mode filter of claim 5, wherein the first and second sensing stages each include two capacitors with the same capacitance.

10. The multistage active common mode filter of claim 5, wherein the first and second injection stages each include two capacitors with the same capacitance.

* * * * *